US011500399B2

(12) United States Patent
Shindin et al.

(10) Patent No.: US 11,500,399 B2
(45) Date of Patent: Nov. 15, 2022

(54) ADJUSTABLE CONTROL OF FLUID PROCESSING NETWORKS BASED ON PROPORTIONS OF SERVER EFFORT

(71) Applicant: International Business Machines Corporation, Armonk, NY (US)

(72) Inventors: Evgeny Shindin, Nesher (IL); Odellia Boni, Giva'at Ela (IL); Harold Jeffrey Ship, Mitzpe Netofa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/150,135

(22) Filed: Jan. 15, 2021

(65) Prior Publication Data

US 2022/0229451 A1 Jul. 21, 2022

(51) Int. Cl.
*G05D 7/06* (2006.01)

(52) U.S. Cl.
CPC ......... *G05D 7/0623* (2013.01); *G05D 7/0676* (2013.01)

(58) Field of Classification Search
CPC ........................... G05D 7/0623; G05D 7/0676
See application file for complete search history.

(56) References Cited

U.S. PATENT DOCUMENTS 5,775,803 A * 7/1998 Montgomery ...... B01F 35/8311 366/152.2
2006/0015309 A1* 1/2006 Weiss .................... G06Q 10/06 703/6
2006/0047488 A1 3/2006 Meents et al.
2010/0126433 A1* 5/2010 Kozaki ..................... F22D 5/30 122/451 R
2014/0020418 A1* 1/2014 Chainer ............. H05K 7/20836 62/129
2015/0088586 A1* 3/2015 Pavlas ................. G06F 9/45558 705/7.25
2021/0084797 A1* 3/2021 Shao .................... H05K 7/2079

OTHER PUBLICATIONS

Avram, Florin et al., "An Optimal Control Approach to Optimization of Multiclass Queueing Networks", Proceedings of the IMA, Research Gate, Jan. 1995, 35 pages.
Bertsimas, Dimitris et al., "Robust Fluid Processing Networks", IEEE Transactions on Automatic Control, vol. 60, No. 3, Mar. 2015, 14 pages.
Chen, Hong et al., "Optimal scheduling control in a multi-class fluid network", Proceedings of the 28th Conference on Decision and Control, Aug. 6, 2002, 2 pages.

(Continued)

*Primary Examiner* — Rocio Del Mar Perez-Velez
*Assistant Examiner* — Christopher W Carter
(74) *Attorney, Agent, or Firm* — Barry D. Blount

(57) ABSTRACT

An example system includes a processor to receive parameters of a fluid network control system. The processor can formulate an optimal control problem as proportions of server effort. The processor can also solve the optimal control problem using a robust counterpart of a separated continuous linear programming (SCLP). The processor can further adjust a parameter of the fluid network control system based on the optimal solution.

17 Claims, 7 Drawing Sheets

Receive Parameters of Fluid Network Control System — 302

Formulate Optimal Control Problem as Proportions of Server Effort — 304

Solve Optimal Control Problem Using Robust Counterpart of SCLP — 306

Adjust Parameters of Fluid Network Control System Based on Optimal Solution — 308

300

(56) References Cited

OTHER PUBLICATIONS

Maglaras, Constantinos, "Design of dynamic control policies for stochastic processing networks via fluid models", Proceedings of the 36th Conference on Decision and Control, Aug. 6, 2002, 6 pages.
Meyn, Sean, "Stability and optimization of queueing networks and their fluid models", University of Illinois Research Board Grant Beckman, Research Gate, Sep. 24, 1998, 25 pages.
Sethuraman, Jay et al., "Optimal Stochastic Scheduling in Multiclass Parallel Queues", ACM SIGMETRICS Performance Evaluation Review, May 1999, 10 pages.

* cited by examiner

100

ADJUSTABLE CONTROL OF FLUID PROCESSING NETWORKS BASED ON PROPORTIONS OF SERVER EFFORT

BACKGROUND

The present techniques relate to fluid processing networks. More specifically, the techniques relate to controlling fluid processing networks.

Adjustable robust policies may be typically defined using information on service rates or mean service times that are observable and the resulting control policy adjustable according to these observations. However, in continuous time systems, such settings may not be realized. Some fluid processing network control problems may be formulated as separated continuous linear programming (SCLP) problems. However, such solutions generally do not cover the case where service rates are uncertain. Moreover, solutions that do cover such cases may use a single non-adjustable policy for such kind of uncertainty. For example, Bertsimas et al. (2015) describe a robust fluid approach to the control of processing networks. However, the robust fluid model of Bertsimas et al. treats uncertainty in a deterministic manner using a frame work of robust optimization, which leads to scheduling policies that perform closely against the optimal policy. Thus, Bertsimas et al. provides for a policy that may be therefore less than optimal because the policy reserves some sever effort to meet the worst case. Moreover, the fluid model of Bertsimas et al. may be difficult to practically implement.

SUMMARY

According to an embodiment described herein, a system can include processor to receive parameters of a fluid network control system. The processor can also further formulate an optimal control problem as proportions of server effort. The processor can also solve the optimal control problem using a robust counterpart of a separated continuous linear programming (SCLP). The processor can also adjust a parameter of the fluid network control system based on the optimal solution. The system may thus enable more efficient adjustment of parameters of a fluid network control system and also be easily implementable using any SCLP based tool. Optionally, the robust counterpart of the SCLP is a reservation-free policy. In this embodiment, the system enables any effort that would be otherwise reserved to be saved.

According to another embodiment described herein, a method can include receiving, via a processor, parameters of a fluid network control system. The method can further include formulating, via the processor, an optimal control problem as proportions of server effort. The method can also further include solving, via the processor, the optimal control problem using a robust counterpart of a separated continuous linear programming (SCLP). The method can also include adjusting, via the processor, a parameter of the fluid network control system based on the optimal solution. The method may thus enable more efficient adjustment of parameters of a fluid network control system and also be easily implementable using any SCLP based tool. Optionally, the robust counterpart of the SCLP is a reservation-free policy. In this embodiment, the method enables any effort that would be otherwise reserved to be saved.

According to another embodiment described herein, a computer program product for controlling fluid processing networks can include computer-readable storage medium having program code embodied therewith. The computer readable storage medium is not a transitory signal per se. The program code executable by a processor to cause the processor to receive parameters of a fluid network control system. The program code can also cause the processor to formulate an optimal control problem as proportions of server effort. The program code can also cause the processor to solve the optimal control problem using a robust counterpart of a separated continuous linear programming (SCLP). The program code can also cause the processor to adjust a parameter of the fluid network control system based on the optimal solution. The computer program product may thus enable more efficient adjustment of parameters of a fluid network control system and also be easily implementable using any SCLP based tool. Optionally, the robust counterpart of the SCLP is a reservation-free policy. In this embodiment, the computer program product enables any effort that would be otherwise reserved to be saved.

DETAILED DESCRIPTION

Figure 1:
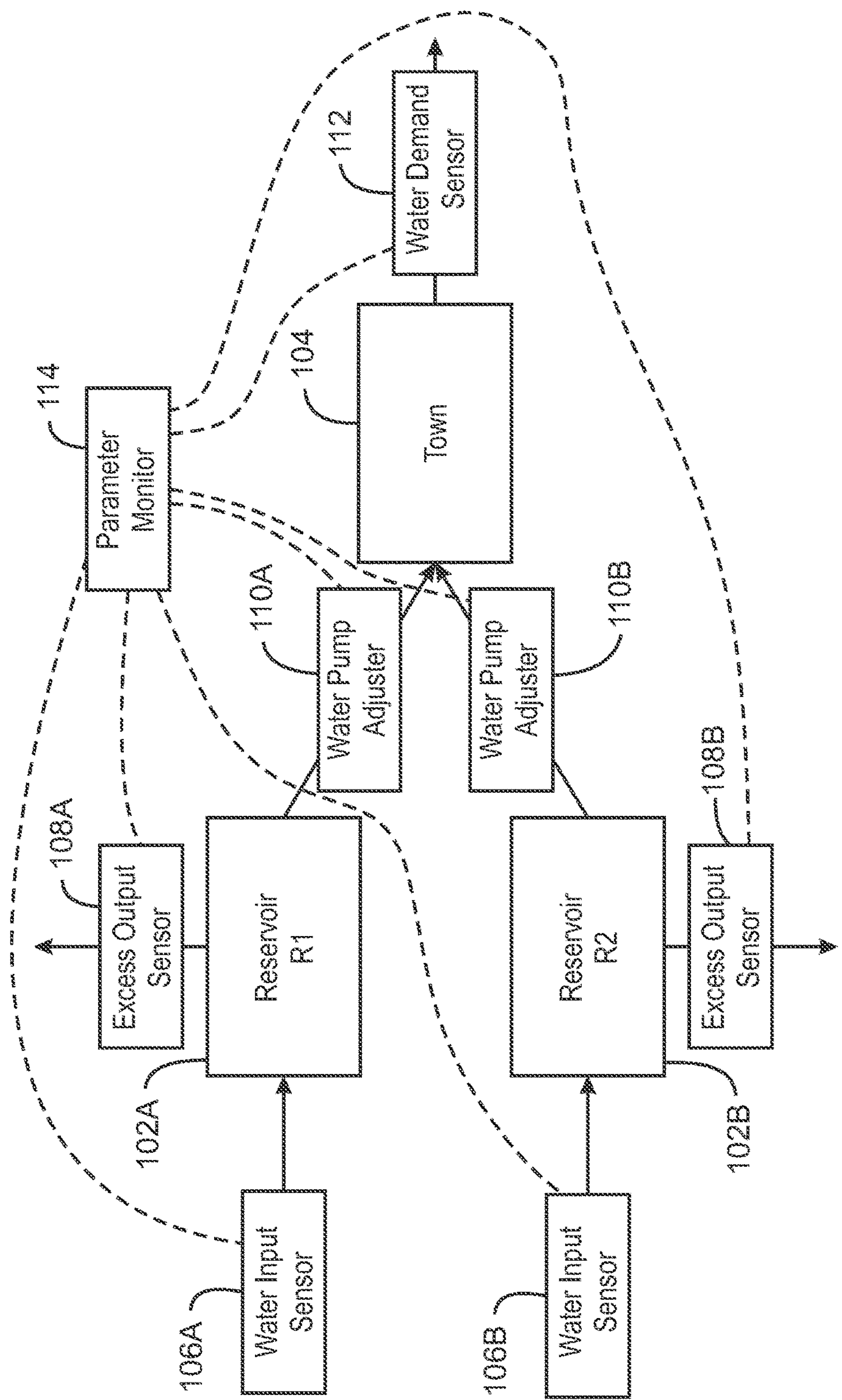
FIG. 1 is a block diagram of an example water distribution system according to embodiments described herein.

There are many problems that can be modelled or approximated using fluid processing networks. For example, an example fluid processing network may include a number of buffers k=1, . . . , K. The example fluid processing network may also include a number of servers i=1, . . . , I. The example fluid processing network also may include a number of flows j=1, . . . , J, where s(j)=i if a flow j is processed by a server i and f(j)=k if a flow j empties into a buffer k. The example fluid processing network further includes an initial amount of the fluid in the buffer k $\alpha_k$ and an exogenous input rate to the buffer k $a_k$. For example, the exogenous input rate may be the rate of input from outside the system. The example fluid processing network also includes a service rate $\mu_j$ of server i=(j) per unit of flow j, where $\tau_j=1/\mu_j$. As used herein, a service rate refers to how fast jobs can be serviced. For example, the service rate $\mu_j$ may be measured in tasks per unit of processing time and indicates how fast the server processes one unit of flow. The example fluid processing network also includes a proportion $p_j$, of flow j that comes to a buffer k after processing and a holding cost $h_k$ for the buffer k. Based on these parameters, an optimal control policy u(t) could be found by minimizing the holding cost of the buffer:

$$\min\int_0^T h^T x(t)dt \quad \text{Eq. 1}$$

$$s.t.\int_0^T Gu(s)ds+x(t)=\alpha+at$$

$$Hu(t)\le b$$

$$x(t),u(t)\ge 0, 0\le t\le T$$

where T is some finite time horizon, x(t) is the quantity of fluid held in a buffer, and u(s) is the control policy that indicates how many fluid units per unit of time that the flow j takes from the buffer. Alternatively, the optimal control policy may be found by maximizing:

$$\max\int_0^T (T-t)c^T u(t)dt \quad \text{Eq. 2}$$

$$s.t.\int_0^T Gu(s)ds+x(t)=\alpha+at$$

$$Hu(t)\leq b$$

$$x(t),u(t)\geq 0, 0\leq t\leq T.$$

where the matrix G in Equations 1 and 2 may be set as:

$$G=\begin{cases} G_{k,j}=-1 & f(j)=k \\ G_{k,j}=-p_{j,k} & f(j)\neq k \end{cases} \quad \text{Eq. 3}$$

and the matrix H in Equations 1 and 2 may be set as:

$$H=\begin{cases} H_{i,j}=\tau_j & s(j)=i \\ H_{i,j}=0 & s(j)\neq i \end{cases} \quad b_i=1\forall\, i \quad \text{Eq. 4}$$

However, the parameters service rate per unit $\mu_j$ or processing time per unit $\tau_j$ are often uncertain. For example, service rates may not be known exactly. Moreover, these parameters may also change over time. A robust counterpart of an uncertain separated continuous linear programming (SCLP) may be used to overcome this issue. For example, processing time per unit may belong to the uncertainty set:

$$\tau_j=\bar{\tau}_j+\tilde{\tau}_j\zeta_j(t), \zeta_j(t)\in[0;1], \Sigma_{j:s(j)=i}\zeta_j(t)\leq\Gamma_i \quad \text{Eq. 5}$$

where $\bar{\tau}_j$ is some nominal time, and $\tilde{\tau}_j\zeta_j$(t) is a deviation with $\zeta_j$(t) having a value between 0 and 1, and $\Gamma_i$ is the uncertainty budget of server i. In various examples, a robust counterpart of an uncertain SCLP may therefore be calculated using:

$$\max\int_0^T (T-t)c^T u(t)dt \quad \text{Eq. 6}$$

$$\text{s.t.} \int_0^t Gu(s)ds+x(t)=\alpha+at$$

$$\Gamma_i\beta_i(t)+\sum_{j:s(j)=i}(\tau_j u_j(t)+\delta_j(t))\leq b_i\forall\, i$$

$$\beta_i(t)+\delta_j(t)-\tilde{\tau}_j u_j(t)\geq 0\forall\, i,\ j:s(j)=i$$

$$x(t),\ u(t)\geq 0,\ 0\leq t\leq T$$

which may be solved to obtain an optimal policy for the worst case realization of the uncertainty. However, a system using the above equations may be hard to implement. For example, for nominal policy, an optimal control can be implemented as a proportion of time that a server i works on a flow j. The nominal policy may be according to the equation:

$$\eta_j(t)=\tau_j u_j(t) \quad \text{Eq. 7}$$

A robust policy may be calculated using the equation:

$$\eta_j(t)=\bar{\tau}_j u_j(t)+\tilde{\tau}_j\zeta_j(t)u_j(t) \quad \text{Eq. 8}$$

In Equation 7, the proportion of server time depends on uncertainty realization. However, the uncertainty realization generally cannot be observed. In addition, such policies may be sub-optimal. For example, an amount of $\Gamma_i\beta_i(t)+\Sigma_{j:s(j)=i}\delta_j$ (t) server effort may be always reserved to meet worst case uncertainty realization, even if the actual realization is better.

According to embodiments of the present disclosure, a fluid processing system may be adjustably controlled. An example system includes a processor to receive parameters of a fluid network control system. The processor can formulate an optimal control problem as proportions of server effort. The processor can solve the optimal control problem using a robust counterpart of a separated continuous linear programming (SCLP). The processor can then adjust a parameter of the fluid network control system based on the optimal solution. Thus, embodiments of the present disclosure provide an adjustable robust counterpart for continuous-time problems. The embodiments thus allow a control of a fluid processing networks that is much easier to implement due to being based on proportions of server loads or times. In particular, the techniques use a robust policy where fractions of server effort are piecewise constant and do not depend on any uncertainty realization. This robust policy does not require observability of the service rates and can be considered adjustable in terms of controls. In addition, the embodiments of the present disclosure provide for reservation-free policies that do not reserve server effort to meet uncertainty because they are adjustable to uncertainty in service rates. The embodiments herein thus work in continuous time and are able to handle uncertainty in service rates, without having to reserve server effort in advance. Therefore, the embodiments of the present disclosure are more efficient in terms of server load or server time usage. Furthermore, the techniques described herein may use the same structure as a regular SCLP allowing to obtain an adjustable robust control policy by solving an SCLP in advance using any suitable algorithm. Thus, the robust SCLP counterpart can be reformulated as an SCLP problem and solved by any SCLP solver. Therefore, the embodiments may be easily implementable.

With reference now to FIG. 1, a block diagram shows an example water distribution system 100 according to embodiments described herein. The example water distribution system 100 can be implemented using the method 300 of FIG. 3 via the computing device 400 or the computer-readable media 700.

The example water distribution system 100 of FIG. 1 includes a pair of reservoirs 102A and 102B coupled to the water supply of a town 104. The water distribution system 100 also includes a pair of water input sensors 106A and 106B coupled to the input of reservoirs 102A and 102B. The water distribution system 100 further includes excess output sensors 108A and 108B coupled to outputs of reservoirs 102A and 102B, respectively. For example, the excess output sensors 108A and 108B may measure water flow at one or more spillways of the reservoirs 102A and 102B, respectively. The water distribution system 100 also further includes a pair of water pump adjusters 110A and 110B coupled to water pumps attached to the reservoirs 102A and 102B that supply water to the town 104. The water distribution system 100 also includes a water demand sensor 112 to measure the water demand of the town 104. The water distribution system 100 also further includes a parameter monitor 114 communicatively coupled to the water input sensors 106A and 106B, the excess output sensors 108A and 108B, the water pump adjusters 110A and 110B, and the water demand sensor 112.

In the example of FIG. 1, the parameter monitor 114 may receive various parameter values from various sensors of the water distribution system 100. For example, the water input sensor 106A may measure a rate of input water r1(t) for reservoir 102A. Similarly, the water input sensor 106B may measure a rate of input water r2(t) for reservoir 102B. The excess output sensor 108A can measure the rate of excess water w1(t) spilling out of reservoir 102A. Similarly, the excess output sensor 108B can measure the rate of excess water w2(t) spilling out of reservoir 102B. The water pump adjuster 110A can adjust the rate u1(t) at which water is pumped from reservoir 102A into town 104. Similarly, the water pump adjuster 110B can adjust the rate u2(t) at which water is pumped from reservoir 102B into town 104. The demand sensor 112 can measure the overall water demand d(t) of town 104. In various examples, the water demand sensor 112 may be any number of water meters installed in the town 104.

Still referring to FIG. 1, when either reservoir 102A or 102B is full, the water spills over and goes to waste. In various examples, an optimal policy of pumping water from the reservoirs to satisfy the demand of the town 104 may be calculated to minimize the cost over a time period [0, T).

In various examples, an optimal control problem for the water distribution system 100 may be formulated in terms of proportions of server times. For example, an uncertainty set in may be represented using the different formulation:

$$\mu_j=\bar{\mu}_j-\tilde{\mu}_j\zeta_j(t),\zeta_j(t)\in[0;1]\forall j \quad \text{Eq. 9}$$

where $\bar{\mu}_j$ is a nominal service rate, and $\tilde{\mu}_j\zeta_j(t)$ is a deviation from the nominal service rate, with $\zeta_j(t)$ have a value between 0 and 1. Similarly, a control policy including server capacity constraints may be represented as:

$$\Sigma_{j:s(j)=i}\eta_j(t)\le b_i \bullet i \quad \text{Eq. 10}$$

where $\eta_j(t)$ is the proportion of time spent on flow. In various examples, an uncertainty propagation may be represented as the equation:

$$u_j(t)=\eta_j(t)(\bar{\mu}_j-\tilde{\mu}_j\zeta_j(t))\forall j \quad \text{Eq. 11}$$

A reformulation of the flow constraints may thus be represented using the equation:

$$\int_0^t G\eta_j(t)(\bar{\mu}_j-\tilde{\mu}_j\zeta_j(t))ds+x(t)=a+at \quad \text{Eq. 12}$$

representing a policy that is a robust counterpart of an SCLP, from which $\eta_j(t)$ can be determined. Since this policy does not reserve server effort for any worst case realization, and available server effort is always used rather than reserved, such policy is more efficient than a policy based on Eq. 6. Moreover, such a policy may be easily implemented by reading parameters from sensors 106A, 106B, 108A, 108B, and 112, and adjusting parameters at the water pump adjusters 110A and 110B. For example, the water pump adjusters 110A and 110B may adjust water flow rates accordingly. In various examples, the water flow rates may be thus adjustable in real-time, based on changes in demand received from the water demand sensor 112 or changes in water input rates as received from water input sensors 106A and 106B.

It is to be understood that the block diagram of FIG. 1 is not intended to indicate that the water distribution system 100 is to include all of the components shown in FIG. 1. Rather, the water distribution system 100 can include fewer or additional components not illustrated in FIG. 1 (e.g., additional client devices, or additional resource servers, etc.).

Figure 2:
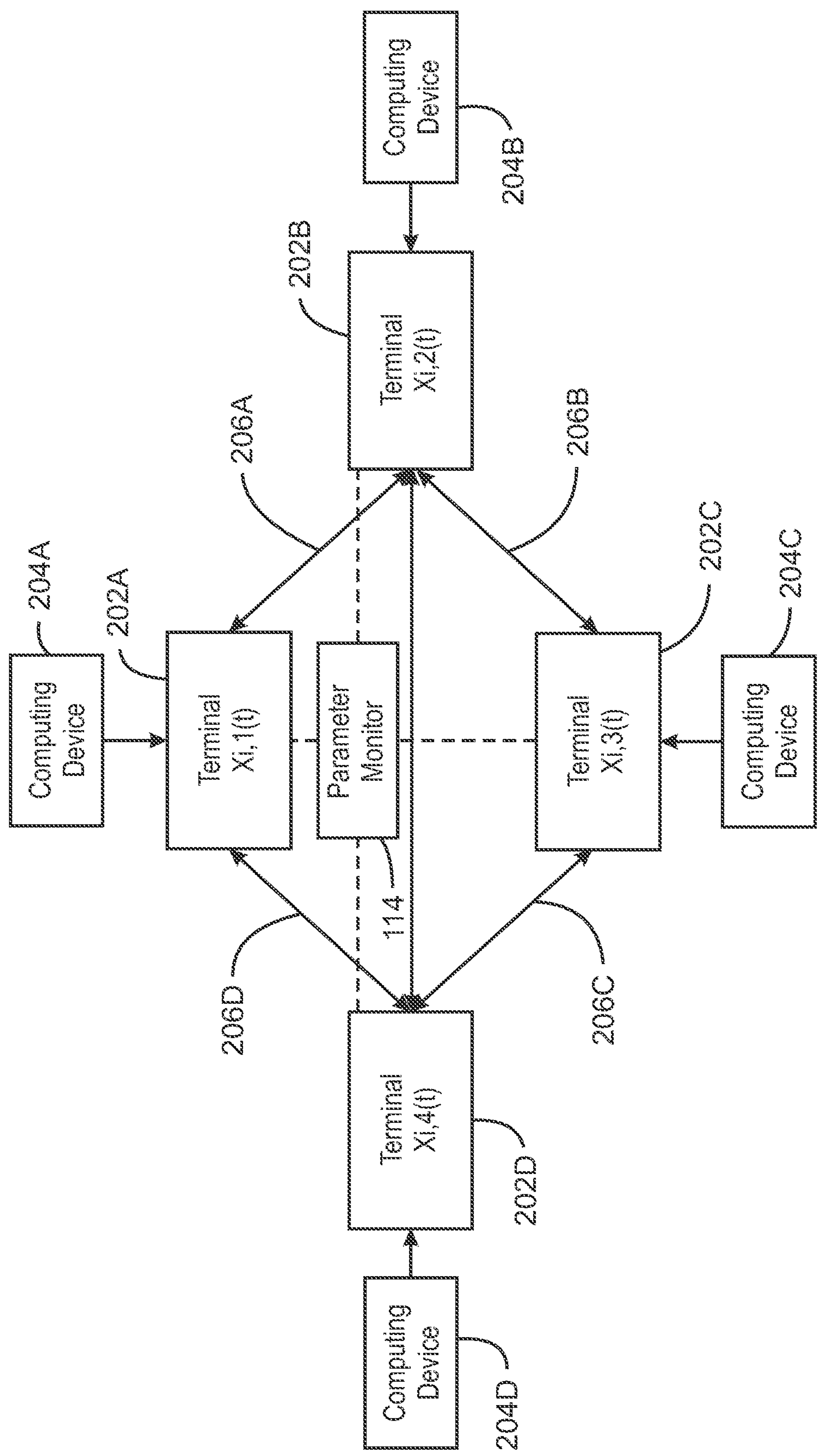
FIG. 2 is a block diagram of an example communication network according to embodiments described herein.

FIG. 2 is a block diagram shows an example communication network 200 according to embodiments described herein. The example communication network 200 can be implemented using the method 300 of FIG. 3 via the computing device 400 or the computer-readable media 700.

The example communication network 200 of FIG. 2 includes a first terminal 202A. The communication network 200 also includes a terminal 202B communicatively coupled to the terminal 202A and a terminal 202C. The communication network 200 further includes a terminal 202D communicatively coupled to the terminal 202C and the terminal 202A. In various examples, the terminals 202A, 202B, 202C, and 202D may be computing devices, such as routing devices, computing machine, or virtual computing machines. The communication network 200 also includes a set of computing devices 204A, 204B, 204C, and 204D communicatively coupled to the terminals 202A, 202B, 202C, and 202D, respectively. The communication network 200 also further includes a parameter monitor 114 communicatively coupled to the terminals 202A, 202B, 202C, and 202D. The communication network 200 further includes a link 206A communicatively connecting terminals 202A and 202B. The communication network 200 also includes a link 206B communicatively connecting terminals 202B and 202C. The communication network 200 also further includes a link 206C communicatively connecting terminals 202C and 202D. The communication network 200 also include a link 206D communicatively connecting terminals 202A and 202D. In various examples, the links 206A, 206B, 206C, and 206D may be network communication links, such as Wi-Fi, cellular, or fiber optic links.

In the example of FIG. 2, data from computing devices 204A, 204B, 204C, and 204D enters terminals 202A, 202B, 202C, and 202D, respectively. In various examples, the data may be designated to be sent to one of the other terminals than the terminal receiving the data. For example, the data may be received at terminal 202A and destined for one of terminals 202B, 202C, or 202D. In various examples, each of the terminals 202A, 202B, 202C, and 202D stores received data in a buffer. The data may then be sent to a destination via available links. For example, the data may be sent directly to terminal 202B or 202D from terminal 202A. In some examples, the data may be sent indirectly via another terminal. For example, data received form computing device 204A at terminal 202A may be sent to terminal 202C via either terminal 202B or terminal 202D.

Still referring to FIG. 2, a set of telephone exchanges or computer terminals may be linked by the communication network 200. In various examples, data may enter each terminal with each bit destined to be sent to one of the remaining terminals. A policy may be calculated over the time period [0, T) to minimize the total time spent in the network by all data. For example, the policy may include which links are used to send data from a particular terminal to one or more other terminals. In addition, each of the terminals 202A, 202B, 202C, or 202D may have a buffer with an associated cost for storing data. For example, the cost of storing data for each of the terminals 202A, 202B, 202C, or 202D may be a function of time used to store the data and the amount of data stored. In various examples, an optimal control problem may be formulated using Eq. 9 and solved using a robust counterpart of an SCLP. For example, the optimal control problem may be solved using Eq. 12. For example, k=1, . . . , K may be the number of buffers. In addition, i=1, . . . , I may be the number of servers, and j=1, . . . , J may be the number of flows. Moreover, s(j)=i if flow j is processed by server i, or f(j)=k if flow j empties buffer k. Furthermore, $a_k$ may be an initial amount of the fluid in the buffer k and $a_k$ may be the exogenous input rate to the buffer k. The $\mu_j$ service rate of server i=s(j) per unit of flow j, where $\tau_j=1/\mu_j$. Finally, $p_{j,k}$ may be the proportion of flow j that comes to buffer k after processing and $h_k$ may be the holding cost for buffer k. In various examples, the parameters may thus include a set of links for a particular data pathway, exogenous input rates, service rates, and holding costs of the buffers. In this manner, the particular links to be used to send data from a particular terminal to another may be determined, as well as the time spent by the data at each terminal. For example, the control variables solved for may be the flow rates in 206A-206D.

It is to be understood that the block diagram of FIG. 2 is not intended to indicate that the communication network 200 is to include all of the components shown in FIG. 2. Rather, the communication network 200 can include fewer or additional components not illustrated in FIG. 2 (e.g., additional terminals, connections, etc.).

Figure 3:
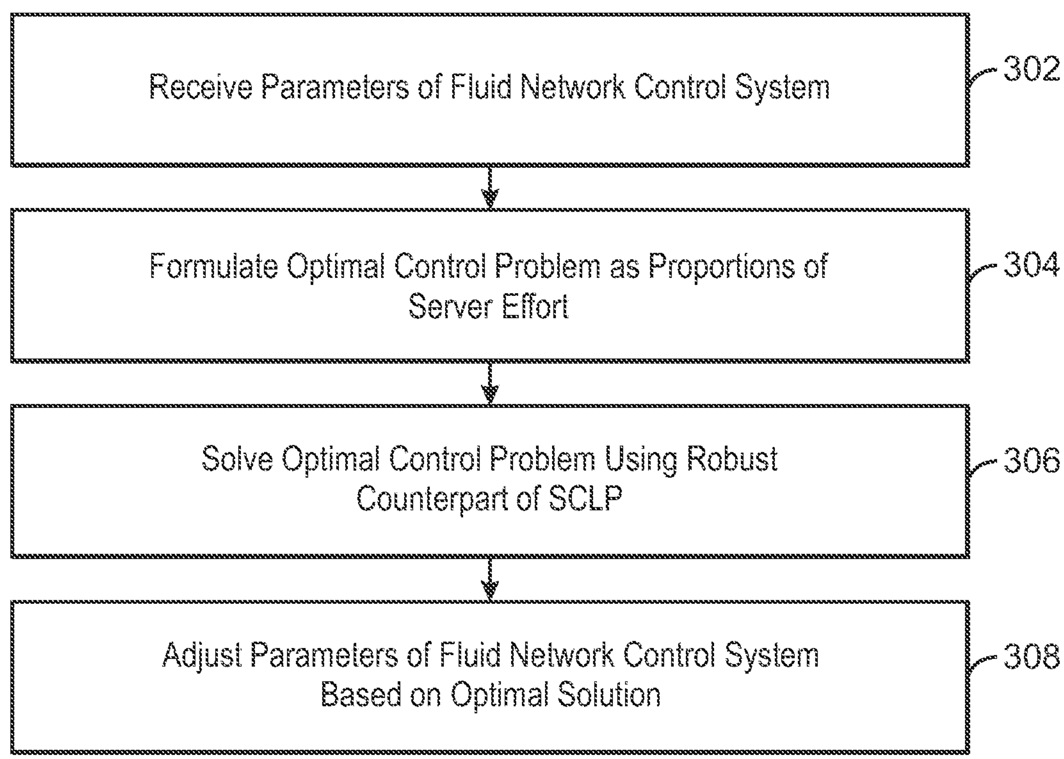
FIG. 3 is a block diagram of an example method that can adjustably control fluid processing networks.

FIG. 3 is a process flow diagram of an example method that can adjustably control fluid processing networks. The method 300 can be implemented with any suitable computing device, such as the computing device 300 of FIG. 3 and can be used to implement the water distribution system 100 or the communication network 200 of FIGS. 1 and 2. For example, the methods described below can be implemented by the processor 402 or the processor 702 of FIGS. 4 and 7.

At block 302, parameters of a fluid network control system are received. For example, fluid network control system may be a water distribution system or a communication network. In the example of a water distribution system, the parameters may include water input rates, excess output rates, water pump rates, and water demand rates. In the example of a communication network, the parameters may include a set of links for a particular data pathway, exogenous input rates, service rates, and holding costs of buffers.

At block 304, an optimal control problem is formulated as proportions of server effort. For example, server times for a number of buffers may be received and the optimal control problem formulated as proportions of server times. In some examples, server loads for a plurality of buffers may be received and the optimal control problem formulated as proportions of server loads. In various examples, the optimal control problem may be formulated using a nominal service rate and a deviation from the nominal service rate. For example, the optimal control problem may be formulated using Eq. 9.

At block 306, the optimal control problem is solved using a robust counterpart of a separated continuous linear programming (SCLP). In various examples, the optimal control problem is solved using a reservation-free control policy. For example, the reservation-free control policy may not reserve server effort for any worst case realization. For example, the optimal control problem may be solved using Eq. 12.

At block 308, a parameter of the fluid network control system is adjusted based on the optimal solution. For example, a water pump flow rate may be adjusted. In some examples, links to be used to send data from a particular terminal to one or more other terminals may be determined.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

In some scenarios, the techniques described herein may be implemented in a cloud computing environment. As discussed in more detail below in reference to at least FIGS. 4-7, a computing device configured to perform fluid processing may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
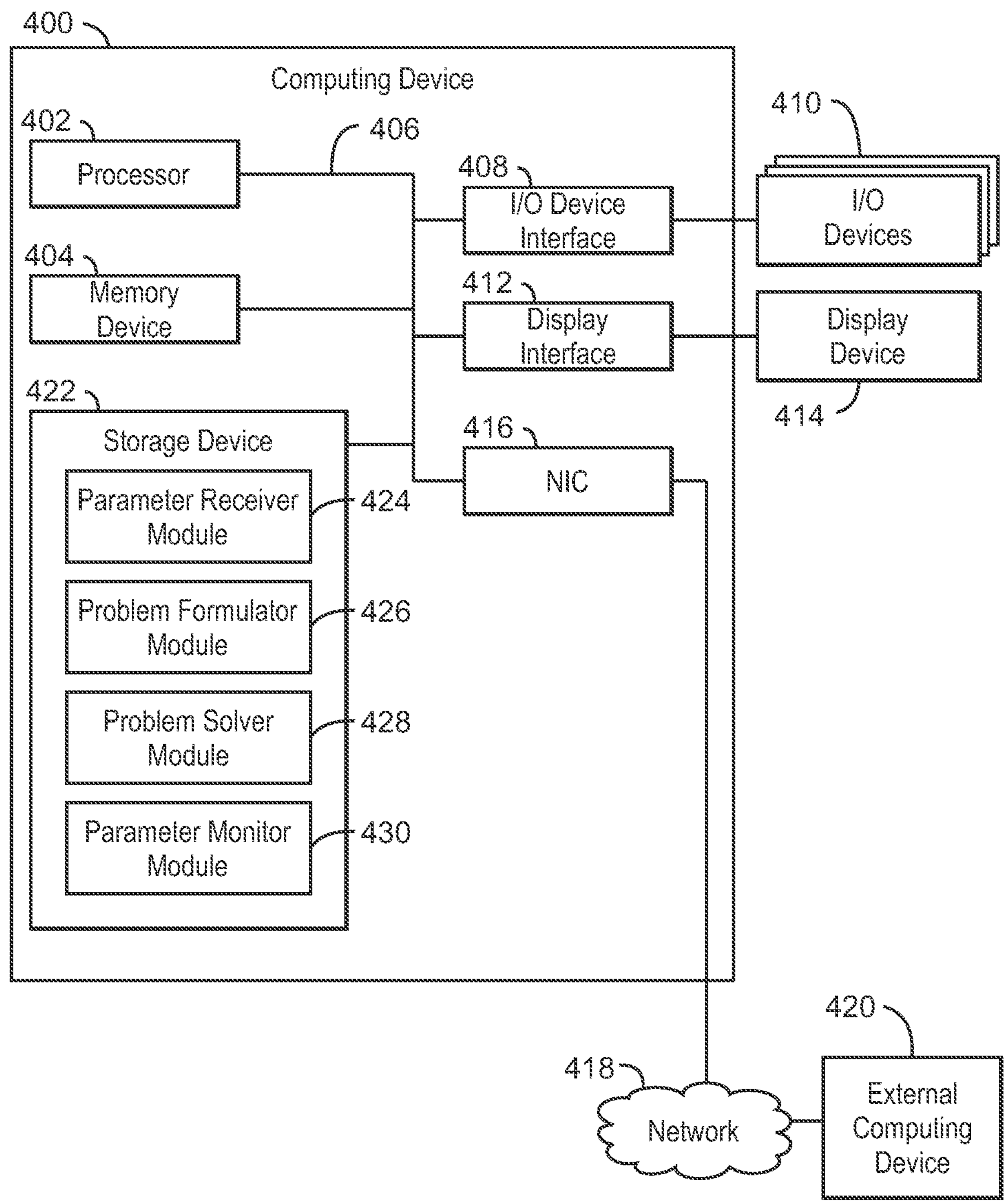
FIG. 4 is a block diagram of an example computing device that can adjustably control fluid processing networks.

FIG. 4 is block diagram of an example computing device that can adjustably control fluid processing networks. The computing device 400 may be for example, a server, desktop computer, laptop computer, tablet computer, or smartphone. In some examples, computing device 400 may be a cloud computing node. Computing device 400 may be described in the general context of computer system executable instructions, such as program modules, being executed by a computer system. Generally, program modules may include routines, programs, objects, components, logic, data structures, and so on that perform particular tasks or implement particular abstract data types. Computing device 400 may be practiced in distributed cloud computing environments where tasks are performed by remote processing devices that are linked through a communications network. In a distributed cloud computing environment, program modules may be located in both local and remote computer system storage media including memory storage devices.

The computing device 400 may include a processor 402 that is to execute stored instructions, a memory device 404 to provide temporary memory space for operations of said instructions during operation. The processor can be a single-core processor, multi-core processor, computing cluster, or any number of other configurations. The memory 404 can include random access memory (RAM), read only memory, flash memory, or any other suitable memory systems.

The processor 402 may be connected through a system interconnect 406 (e.g., PCI®, PCI-Express®, etc.) to an input/output (I/O) device interface 408 adapted to connect the computing device 400 to one or more I/O devices 410. The I/O devices 410 may include, for example, a keyboard and a pointing device, wherein the pointing device may include a touchpad or a touchscreen, among others. The I/O devices 410 may be built-in components of the computing device 400, or may be devices that are externally connected to the computing device 400.

The processor 402 may also be linked through the system interconnect 406 to a display interface 412 adapted to connect the computing device 400 to a display device 414. The display device 414 may include a display screen that is a built-in component of the computing device 400. The display device 414 may also include a computer monitor, television, or projector, among others, that is externally connected to the computing device 400. In addition, a network interface controller (NIC) 416 may be adapted to connect the computing device 400 through the system interconnect 406 to the network 418. In some embodiments, the NIC 416 can transmit data using any suitable interface or protocol, such as the internet small computer system interface, among others. The network 418 may be a cellular network, a radio network, a wide area network (WAN), a local area network (LAN), or the Internet, among others. An external computing device 420 may connect to the computing device 400 through the network 418. In some examples, external computing device 420 may be an external webserver 420. In some examples, external computing device 420 may be a cloud computing node.

The processor 402 may also be linked through the system interconnect 406 to a storage device 422 that can include a hard drive, an optical drive, a USB flash drive, an array of drives, or any combinations thereof. In some examples, the storage device may include a parameter receiver module 424, a problem formulator module 426, a problem solver module 428, and a parameter monitor module 430. The parameter receiver module 424 can receive parameters of a fluid network control system. For example, the fluid network control system may be a water distribution system. In some examples, the fluid network control system may be a communication network. The problem formulator module 426 can formulate an optimal control problem as proportions of server effort. For example, the server effort may be server time and the parameters may be server times for a plurality of buffers. In some examples, the server effort may be server load and the parameters may be server loads for a plurality of buffers. In various examples, the optimal control problem includes parameters such as a nominal service rate, a deviation from the nominal service rate, an objective function, and a constraint. The optimal control problem also includes proportion of server effort as a control variable to be solved. For example, the optimal control problem may be formulated using Eq. 9. The problem solver module 428 can solve the optimal control problem using a robust counterpart of a separated continuous linear programming (SCLP). In various examples, the robust counterpart of the SCLP may be a reservation-free policy. For example, the reservation-free policy may not reserve server effort for any worst case realization. For example, the robust counter part of the SCLP may be based on Eq. 12. The parameter monitor module 430 can adjust a parameter of the fluid network control system based on the optimal solution. For example, the parameter monitor module 430 can adjust a water pump flow rate. In some examples, the parameter monitor module 430 can determine links to be used to send data from a particular terminal to one or more other terminals.

It is to be understood that the block diagram of FIG. 4 is not intended to indicate that the computing device 400 is to include all of the components shown in FIG. 4. Rather, the computing device 400 can include fewer or additional components not illustrated in FIG. 4 (e.g., additional memory components, embedded controllers, modules, additional network interfaces, etc.). Furthermore, any of the functionalities of the parameter receiver module 424, the problem formulator module 426, the problem solver 428, and the parameter monitor module 430 may be partially, or entirely, implemented in hardware and/or in the processor 402. For example, the functionality may be implemented with an application specific integrated circuit, logic implemented in an embedded controller, or in logic implemented in the processor 402, among others. In some embodiments, the functionalities of the parameter receiver module 424, problem formulator module 426, problem solver module 428, and parameter monitor module 430 can be implemented with logic, wherein the logic, as referred to herein, can include any suitable hardware (e.g., a processor, among others), software (e.g., an application, among others), firmware, or any suitable combination of hardware, software, and firmware.

Figure 5:
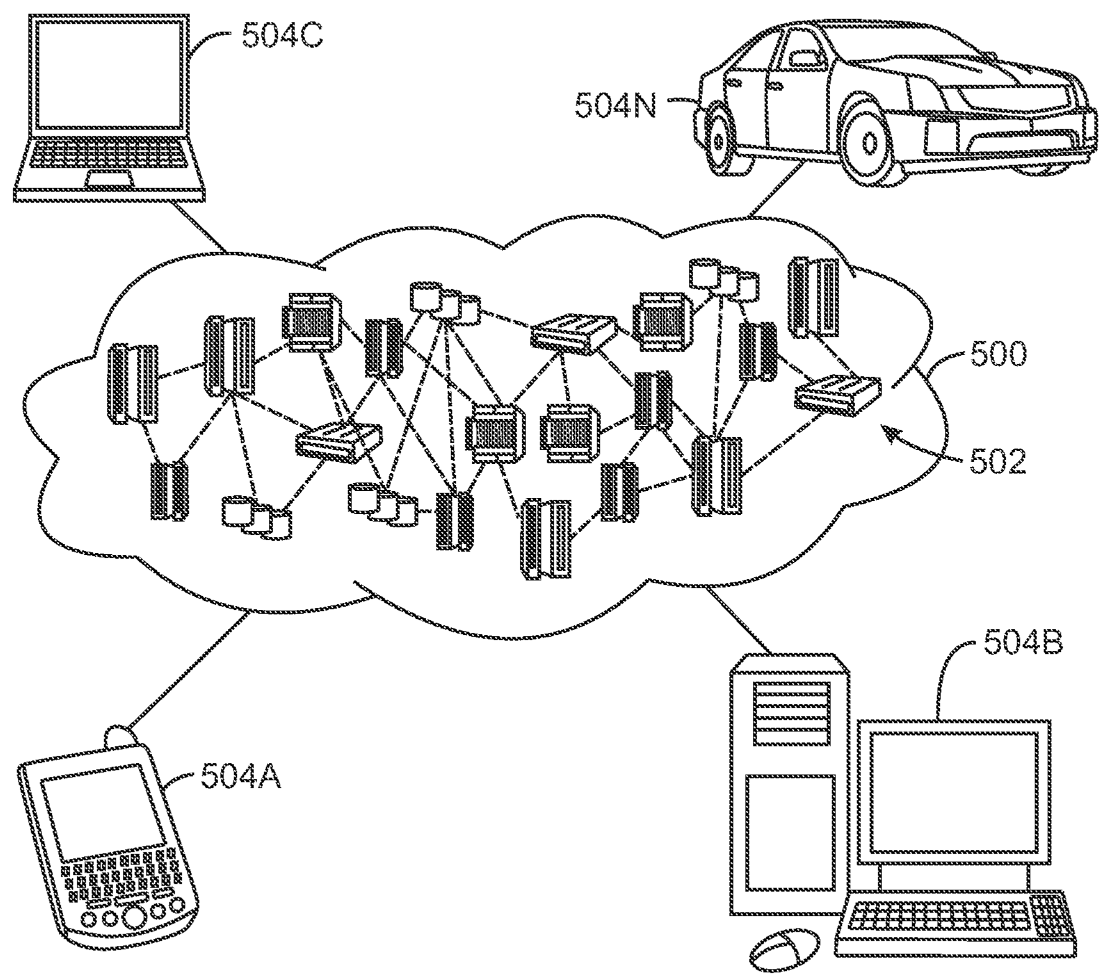
FIG. 5 is a diagram of an example cloud computing environment according to embodiments described herein.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
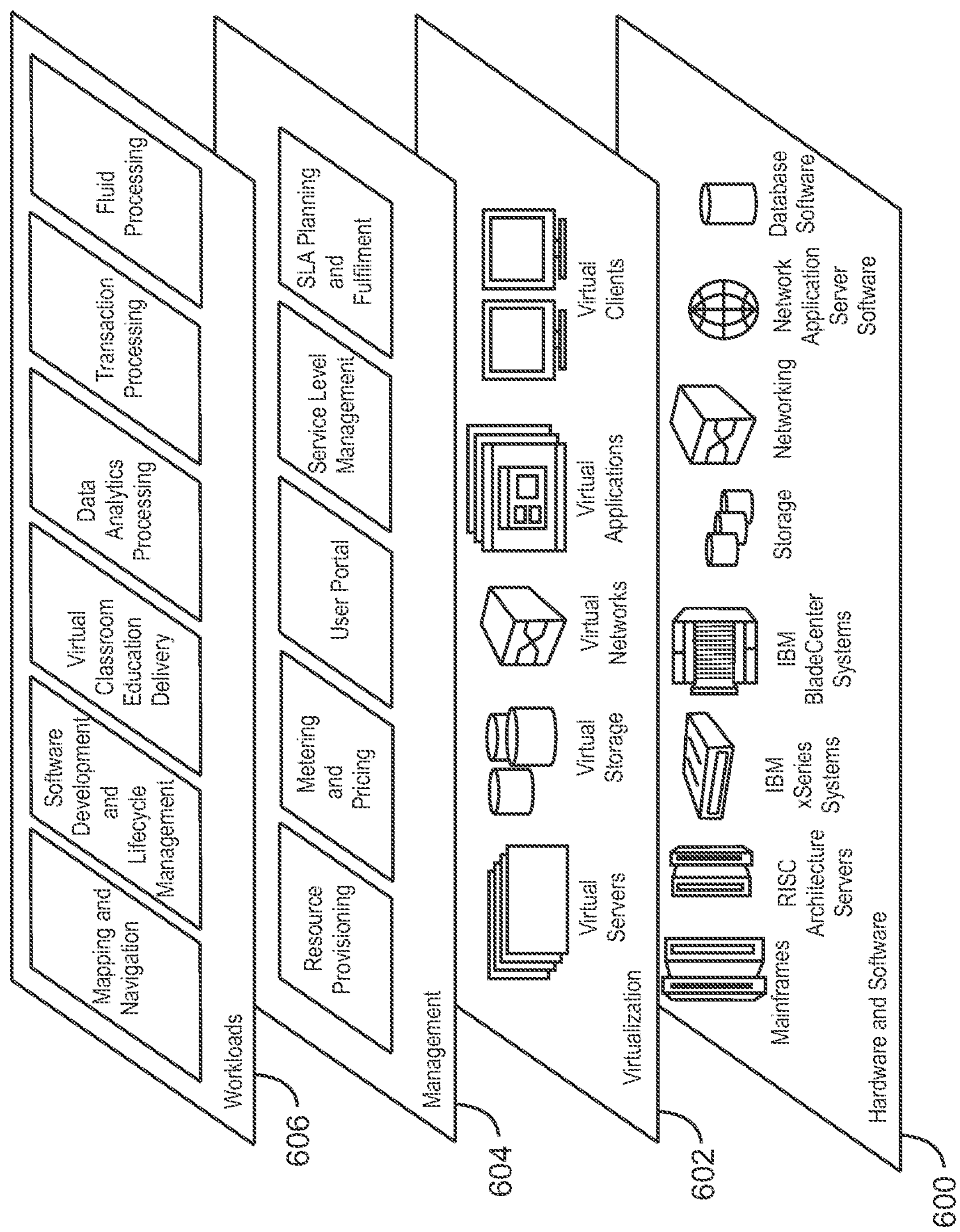
FIG. 6 is a diagram of an example abstraction model layers according to embodiments described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 602 provides an abstraction layer from which the following examples of virtual entities may be provided: virtual servers; virtual storage; virtual networks, including virtual private networks; virtual applications and operating systems; and virtual clients. In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and fluid processing.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
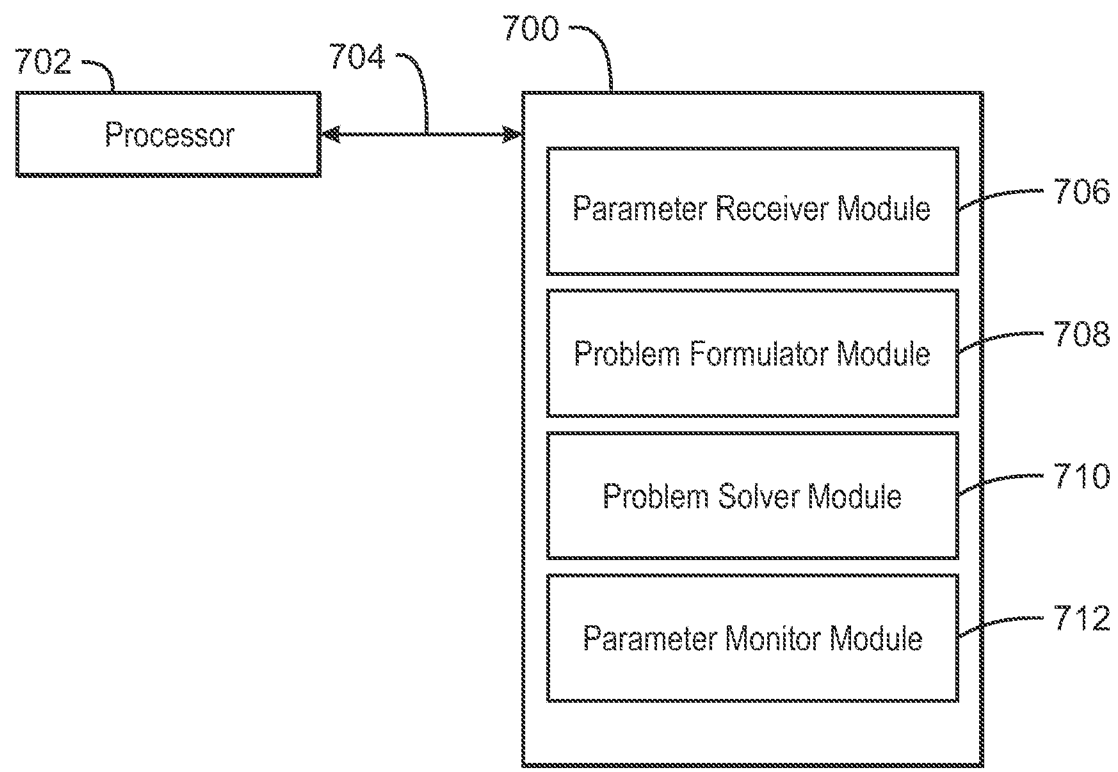
FIG. 7 is an example tangible, non-transitory computer-readable medium that can adjustably control fluid processing networks.

Referring now to FIG. 7, a block diagram is depicted of an example tangible, non-transitory computer-readable medium 700 that can adjustably control fluid processing networks. The tangible, non-transitory, computer-readable medium 700 may be accessed by a processor 702 over a computer interconnect 704. Furthermore, the tangible, non-transitory, computer-readable medium 700 may include code to direct the processor 702 to perform the operations of the method 300 of FIG. 3.

The various software components discussed herein may be stored on the tangible, non-transitory, computer-readable medium 700, as indicated in FIG. 7. For example, a parameter receiver module 706 includes code to receive parameters of a fluid network control system. A problem formulator module 708 includes code to formulate an optimal control problem as proportions of server effort. In some examples, the problem formulator module 708 further includes code to receive server times for a plurality of buffers and formulate the optimal control problem as a proportions of server times. In various examples, the problem formulator module 708 also includes code to receive server loads for a plurality of buffers and formulate the optimal control problem as a proportions of server loads. A problem solver module 710 includes code to solve the optimal control problem using a robust counterpart of a separated continuous linear programming (SCLP). The problem solver module 710 also includes code to use a reservation-free control policy. For example, the reservation-free control policy may not reserve server effort for any worst case realization. A parameter monitor module 712 includes code to adjust a parameter of the fluid network control system based on the optimal solution. For example, the parameter monitor module 712 may include code to adjust a water pump flow rate. In some examples, the parameter monitor module 712 may include code to determine links to be used to send data from a particular terminal to one or more other terminals.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 7 may be included within the tangible, non-transitory, computer-readable medium 700, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:

a processor to:

receive parameters from a plurality of sensors of a fluid network control system, wherein the parameters comprise a water input rate, an excess output rate, a water pump rate, and a water demand rate;

formulate an optimal control problem based on the parameters, wherein the optimal control problem comprises a proportion of server effort dedicated to a specific job class at a specific time interval as a control variable to be solved;

solve the optimal control problem using an adjustable policy comprising a robust counterpart of a separated continuous linear programming (SCLP);

adjust a parameter of the fluid network control system based on the optimal solution; and a water pump adjuster to adjust a flow rate of a water pump in real-time using the adjusted parameter.

2. The system of claim 1, wherein the server effort comprises server time and the parameters comprise server times for a plurality of buffers.

3. The system of claim 1, wherein the server effort comprises server load and the parameters comprise server loads for a plurality of buffers.

4. The system of claim 1, wherein the optimal control problem comprises a nominal service rate, a deviation from the nominal service rate, an objective function, and a constraint.

5. The system of claim 1, wherein the robust counterpart of the SCLP comprises a reservation-free policy.

6. The system of claim 1, wherein the fluid network control system comprises a water distribution system.

7. The system of claim 1, wherein the water pump adjuster to adjust a flow rate of a water pump in real-time based on a change in the water demand rate.

8. The system of claim 1, wherein the water pump adjuster to adjust a flow rate of a water pump in real-time based on a change in the water input rate.

9. A computer-implemented method, comprising:

receiving, via a processor, parameters from a plurality of sensors of a fluid network control system, wherein the parameters comprise a water input rate, an excess output rate, a water pump rate, and a water demand rate;

formulating, via the processor, an optimal control problem based on the parameters, wherein the optimal control problem comprises a proportion of server effort dedicated to a specific job class at a specific time interval as a control variable to be solved;

solving, via the processor, the optimal control problem using an adjustable policy comprising a robust counterpart of a separated continuous linear programming (SCLP);

adjusting, via the processor, a parameter of the fluid network control system based on the optimal solution; and adjusting, via a water pump adjuster, a flow rate of a water pump in real-time using the adjusted parameter.

10. The computer-implemented method of claim 9, wherein formulating the optimal control problem comprises receiving server times for a plurality of buffers and formulating the optimal control problem as proportions of server times.

11. The computer-implemented method of claim 9, wherein formulating the optimal control problem comprises receiving server loads for a plurality of buffers and formulating the optimal control problem as proportions of server loads.

12. The computer-implemented method of claim 9, wherein formulating the optimal control problem comprises using a nominal service rate and a deviation from the nominal service rate.

13. The computer-implemented method of claim 9, wherein solving the optimal control problem comprises using a reservation-free control policy.

14. A computer program product for controlling fluid processing networks, the computer program product comprising a computer-readable storage medium having program code embodied therewith, wherein the computer readable storage medium is not a transitory signal per se, the program code executable by a processor to cause the processor to:

receive parameters from a plurality of sensors of a fluid network control system, wherein the parameters comprise a water input rate, an excess output rate, a water pump rate, and a water demand rate;

formulate an optimal control problem based on the received parameters, wherein the optimal control problem comprises a proportion of server effort dedicated to a specific job class at a specific time interval as a control variable to be solved;

solve the optimal control problem using an adjustable policy comprising a robust counterpart of a separated continuous linear programming (SCLP);

adjust a parameter of the fluid network control system based on the optimal solution; and adjust a flow rate of a water pump in real-time using the adjusted parameter.

15. The computer program product of claim 14, further comprising program code executable by the processor to receive server times for a plurality of buffers and formulate the optimal control problem as a proportions of server times.

16. The computer program product of claim 14, further comprising program code executable by the processor to receive server loads for a plurality of buffers and formulate the optimal control problem as a proportions of server loads.

17. The computer program product of claim 14, further comprising program code executable by the processor to use a reservation-free control policy.

* * * * *